US012724790B2

(12) United States Patent
Tin

(10) Patent No.: US 12,724,790 B2
(45) Date of Patent: Sep. 1, 2026

(54) DATA PROCESSING METHOD AND DEVICE

(71) Applicant: Wistron Corp., New Taipei City (TW)

(72) Inventor: Hsiao Wen Tin, New Taipei City (TW)

(73) Assignee: WISTRON CORP., New Taipei City (TW)

( * ) Notice: Subject to any disclaimer, the term of this patent is extended or adjusted under 35 U.S.C. 154(b) by 0 days.

(21) Appl. No.: 18/943,193

(22) Filed: Nov. 11, 2024

(65) Prior Publication Data

US 2026/0099507 A1 Apr. 9, 2026

(30) Foreign Application Priority Data

Oct. 8, 2024 (TW) ................................ 113138166

(51) Int. Cl.
*G06F 16/25* (2019.01)

(52) U.S. Cl.
CPC .................................. *G06F 16/258* (2019.01)

(58) Field of Classification Search
CPC ........ G06N 20/00; G06N 3/0475; G06N 3/08; G06F 16/258
See application file for complete search history.

(56) References Cited

U.S. PATENT DOCUMENTS 12,222,898 B1 * 2/2025 Madan .................. G06F 16/148
12,314,663 B1 * 5/2025 Earle ....................... G06F 40/35
2025/0047622 A1 * 2/2025 Bodigutla ............... H04L 51/02
2025/0131247 A1 * 4/2025 Mondlock .............. G06N 5/022
2025/0245446 A1 * 7/2025 Ayed ......................... G06F 8/35

FOREIGN PATENT DOCUMENTS

CN 117952203 A 4/2024
CN 118520867 A * 8/2024 ........... G06Q 40/125
CN 118551026 A 8/2024

OTHER PUBLICATIONS

Chinese language office action dated Dec. 30, 2025, issued in application No. TW 113138166.

* cited by examiner

*Primary Examiner* — Cheyne D Ly
(74) *Attorney, Agent, or Firm* — McClure, Qualey & Rodack, LLP

(57) ABSTRACT

A data processing method is provided in the invention. The data processing method may be applied to a data processing device. The data processing method may include the following steps. According to a plurality of input data, a processing device of a data processing device may obtain structured data and non-structured data corresponding to each input data. Then, the processing device may combine the structured data with the non-structured data to generate combined data corresponding to each input data. Then, the processing device may store the combined data in a retrieval augmented generation (RAG) database for a large language model (LLM) model.

16 Claims, 6 Drawing Sheets

DATA PROCESSING METHOD AND DEVICE

CROSS REFERENCE TO RELATED APPLICATIONS

This Application claims priority of TW Patent Application No. 113138166 filed on Oct. 8, 2024, the entirety of which is incorporated by reference herein.

BACKGROUND OF THE INVENTION

Field of the Invention

The invention generally relates to data processing technology, and more particularly, to data processing technology in which the image semanteme data will be generated.

Description of the Related Art

As artificial intelligence (AI) technology progresses, the applications for AI are widening. The large language mode (LLM) is an AI program which can identify a query and a prompt from the user and generate a response. Retrieval augmented generation (RAG) may be a generative AI technology combined with the retrieval function. RAG can retrieve related information from an external database, and then use the related information as auxiliary data in the LLM system.

However, when the LLM system performs multi-model data (e.g., non-structured data and structured data) processing, the LLM system may first need to retrieve data with different models from different database, and then combine the retrieved data. Therefore, the LLM system may need more time for calculation and retrieval.

Therefore, how to retrieve data more efficiently to make sure the LLM system can generate responses rapidly and accurately is a subject that is worthy of discussion.

BRIEF SUMMARY OF THE INVENTION

A data processing method and device are provided to overcome the problems mentioned above.

An embodiment of the invention provides a data processing method. The data processing method may be applied to a data processing device. The data processing method may comprise the following steps. According to a plurality of input data, a processing device of the data processing device may obtain structured data and non-structured data corresponding to each input data. Then, the processing device may combine the structured data with the non-structured data to generate combined data corresponding to each input data. Then, the processing device may store the combined data in a retrieval augmented generation (RAG) database for a large language model (LLM) model.

An embodiment of the invention provides a data processing device. The data processing device may comprise a processing device and a retrieval augmented generation (RAG) database. According to a plurality of input data, the processing device may obtain the structured data and the non-structured data that correspond to each input data, and the processing device may combine the structured data with the non-structured data to generate combined data that corresponds to each input data. The RAG database may store the combined data for a large language model (LLM) model.

Other aspects and features of the invention will become apparent to those with ordinary skill in the art upon review of the following descriptions of specific embodiments of a data processing method and device.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
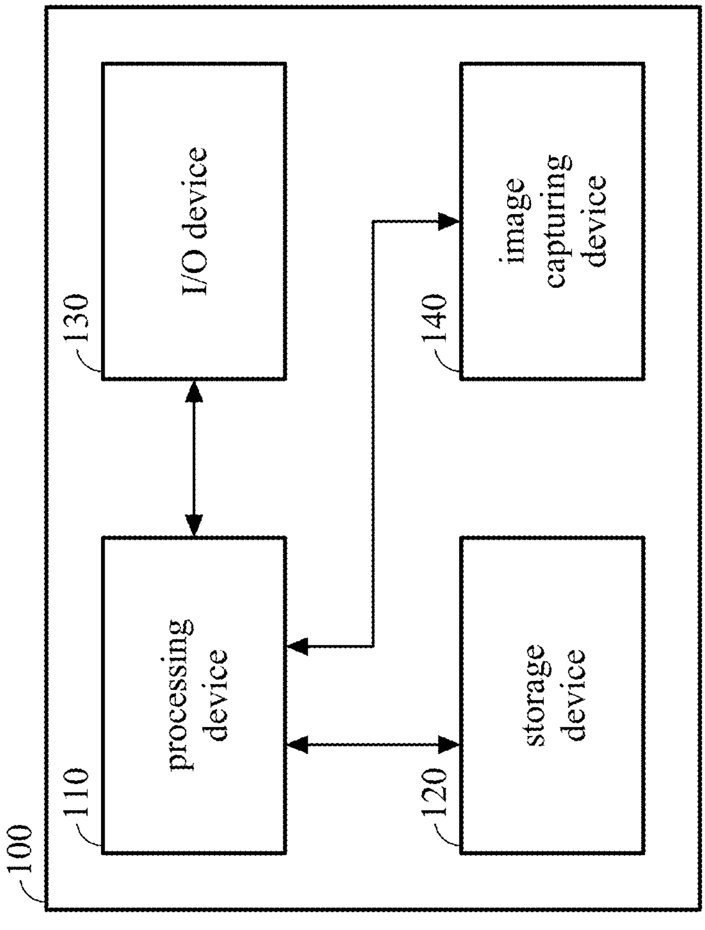
FIG. 1 is a block diagram of a data processing device 100 according to an embodiment of the invention.

FIG. 1 is a block diagram of a data processing device 100 according to an embodiment of the invention. As shown in FIG. 1, the data processing device 100 may comprise a processing device 110, a storage device 120, an input/output (I/O) device 130, and an image capturing device 140. It should be noted that FIG. 1 presents a simplified block diagram in which only the elements relevant to the invention are shown. However, the invention should not be limited to what is shown in FIG. 1. The data processing device 100 may also comprise other elements.

According to an embodiment of the invention, the data processing device 100 may be a smart phone, a tablet, or a desk computer, but the invention should not be limited thereto.

According to an embodiment of the invention, the processing device 110 may be a general-purpose processor, a Central Processing Unit (CPU), a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling, storing and retrieving data (e.g., program code) to and from the storage device 120, sending a series of frame data (e.g. representing text messages, graphics, images, etc.) to the display device (not shown in figures), and receiving user inputs or outputting signals via the I/O device 130. The processing device 110 may coordinate the operations of the storage device 120, the I/O device 130 and the image capturing device 140 to perform the method of the invention. In addition, according to the embodiments of the invention, the processing device 110 may perform a large language model (LLM) system (or LLM model).

According to an embodiment of the invention, the storage device 120 may store the software and firmware program codes, system data, user data, etc. of the data processing device 100. The storage device 120 may be a volatile memory (e.g. Random Access Memory (RAM)), or a non-volatile memory (e.g. flash memory, Read Only Memory (ROM)), a hard disk, or a combination of the above memory devices.

According to an embodiment of the invention, the I/O device 130 may include one or more buttons, a keyboard, a mouse, a touch pad, a video camera, a microphone, and/or a speaker, etc., to serve as the Man-Machine Interface (MMI) for interaction with users. During the LLM operations, the use can input the query and prompt to the LLM system through the I/O device 130.

According to an embodiment of the invention, the image capturing device 140 may be an electronic device with the photography function, e.g., a camera. The image capturing device 140 may be configured to generate image data which needs to be analyzed by the LLM system.

Figure 2:
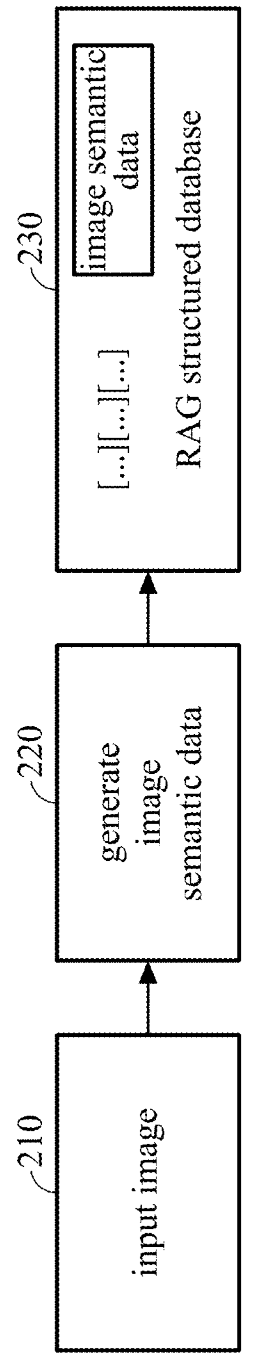
FIG. 2 is a schematic diagram of generating the image semantic data according to an embodiment of the invention.

FIG. 2 is a schematic diagram of generating the image semantic data according to an embodiment of the invention. The flow of generating the image semantic data shown in FIG. 2 can be applied to the data processing device 100. As shown in FIG. 2, when the retrieval augmented generation (RAG) is performed, the non-structured data and the structured data (or vector data) corresponding to an input data 210 may be obtained first. The input data 210 may be from an external database (e.g., an external artificial intelligence (AI) database, an external image database, an external video database, but the invention should not be limited thereto). In addition, the input data 210 may comprise a plurality of images, a plurality of videos and a plurality of image tags, but the invention should not be limited thereto. According to an embodiment of the invention, the non-structured data corresponding to the input data 210 may be an image data, a tag data, a video data or an audio data. The structured data corresponding to the input data 210 may be the semantic data of illustrating the input data 210.

In block 220, the non-structured data corresponding to the input data 210 may be combined with the structured data corresponding to the input data 210 to generate a combined data (i.e., image semantic data). For example, if the input data is an automated optical inspection (AOI) image, the combined data may comprise the non-structured data (e.g., image data (e.g., a printed circuit board (PCB) image) and the tag in the image data (e.g., the defect tag in the PCB image)) and the structured data (e.g., the semantic data illustrating the related information of the PCB of the image data).

In block 230, after the combined data is generated, the combined data may be stored in the RAG structured database (e.g., the vector/structured query language (SQL) database, or a vector relational database) to provide the following operations of the LLM. The RAG structured database may also store other vector/SQL data.

In addition, according to an embodiment of the invention, each combined data may correspond to a topic. Specifically, the combined data with different topics may be clustered according to a clustering algorithm (e.g., a hierarchical clustering technology or a text clustering technology, but the invention should not be limited thereto). For example, after the clustering, a topic x may comprise a data group of image data and the semantic data of the image data. The topic x may be expressed by $x=\{(IiDi|i=1 \ldots n)\}$, wherein Ii represents the image data of the image i, and Di represents the semantic data of the image I, and n represents the size of the group of topic x. For example, in an AOI topic, the image i may be a PCB image. The LLM may be used to illustrate the elements of the image i, e.g., "Green areas: Ground and power planes\n-Blue areas: Signal layers\n-White lines: Silkscreen\n-Yellow lines: Routing traces\n-Orange lines: Keep-out areas\n-Black lines: Board outline". Therefore, the combined data (i.e., image semantic data) corresponding to the image i may comprise the image data Ii=PCB.jpg (i.e., the image data of the image i) and the semantic data Di=["Green areas: Ground", "Green areas: power planes", "Blue areas: Signal layers", "White lines: Silkscreen", "Yellow lines: Routing traces", "Orange lines: Keep-out areas", "Black lines: Board outline"].

Figure 3:
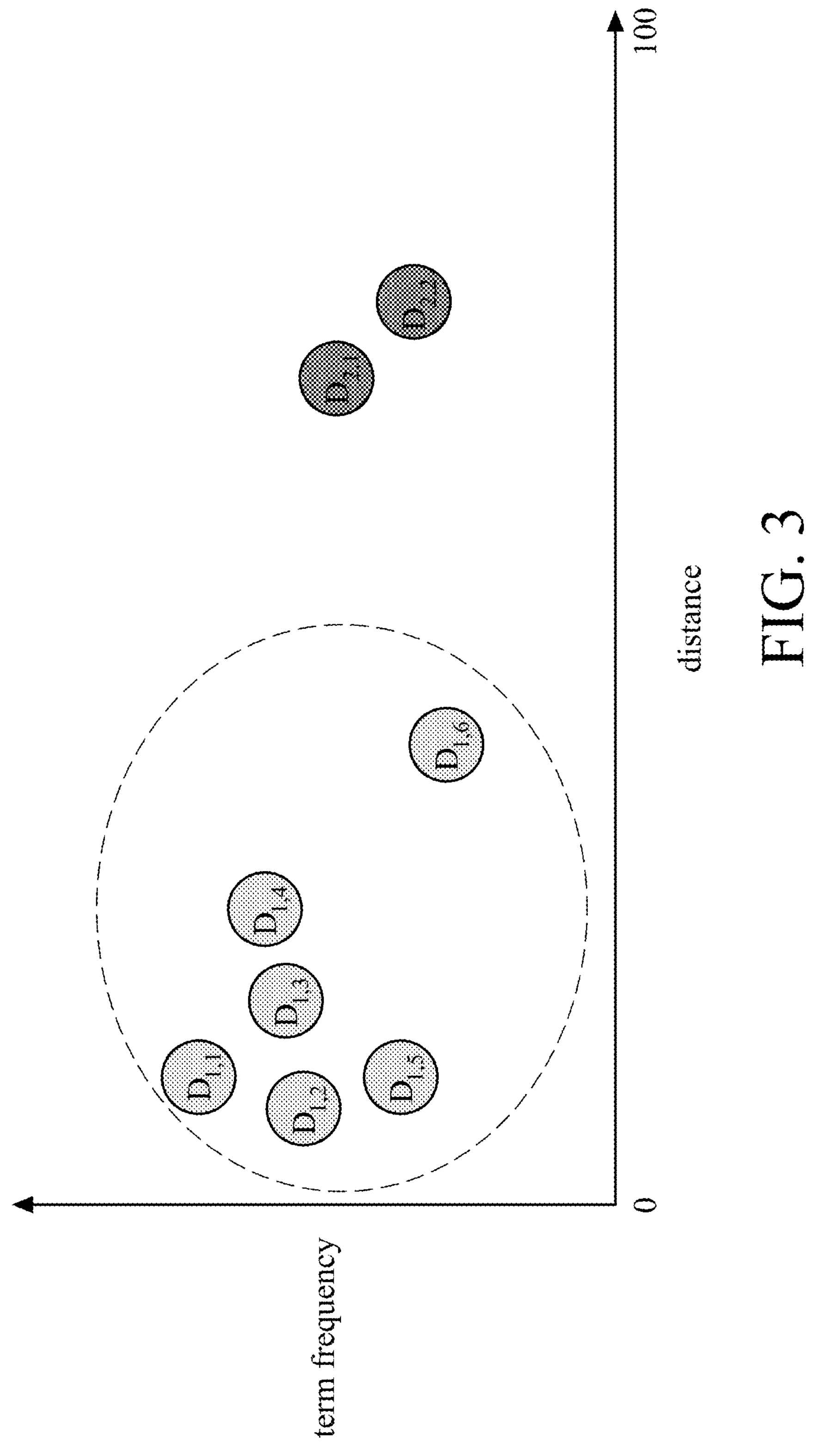
FIG. 3 is a schematic diagram of clustering the topics according to an embodiment of the invention.

During the clustering operation, if the difference between the semantic data of two images is too big, the two images may be clustered to different groups. FIG. 3 is a schematic diagram of clustering the topics according to an embodiment of the invention. As shown in FIG. 3, there are a PCB image 1 and its corresponding semantic data $D_{1,1}$~$D_{1,6}$, and a coffee cup image 2 and its corresponding $D_{2,1}$~$D_{2,2}$. Because the difference between the semantic data of the PCB image 1 and the coffee cup image 2 are too big (or the similarity is too low), the PCB image 1 and the coffee cup image 2 may be clustered to different groups.

Figure 4:
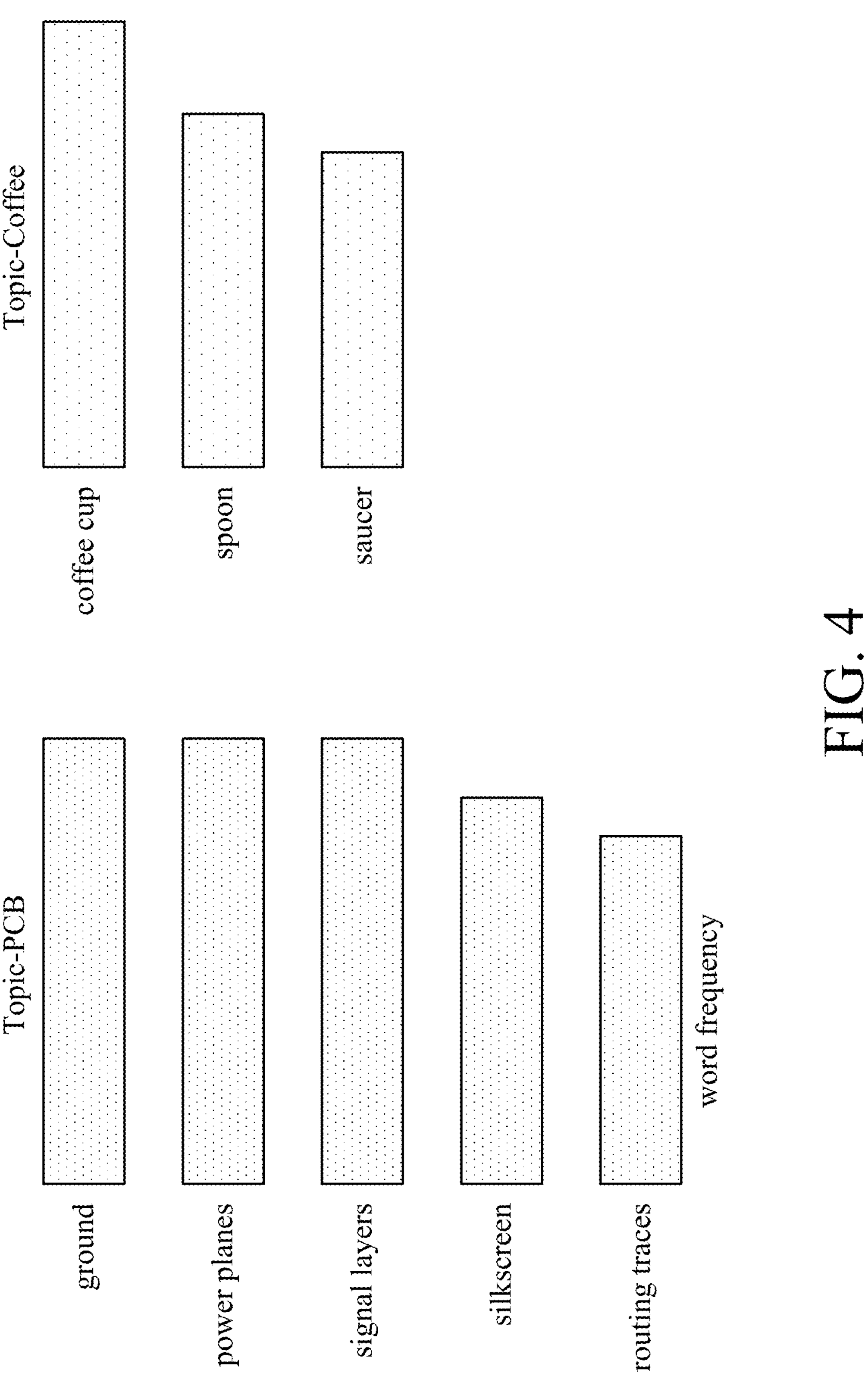
FIG. 4 is a schematic diagram of term frequency of each topic according to an embodiment of the invention.

FIG. 4 is a schematic diagram of term frequency of each topic according to an embodiment of the invention. As shown in FIG. 4, in order to optimize the semantic data, a term frequency algorithm (e.g., term frequency-inverted document frequency (TF-IDF) algorithm, but the invention should not be limited thereto) may be used to calculate the scores of the words in each topic. Then, the words with the highest scores may be kept and taken as the best description of the topic. Taken FIG. 4 as an example, after the term frequency algorithm, for the PCB topic (topic-TCP), the words "ground", "power planes", and "signal layers" may have the highest scores (i.e., the tree words occurs most frequently in the topic). Therefore, the three words (or terms) will be taken as the best description of the PCB topic (topic-TCP).

Figure 5:
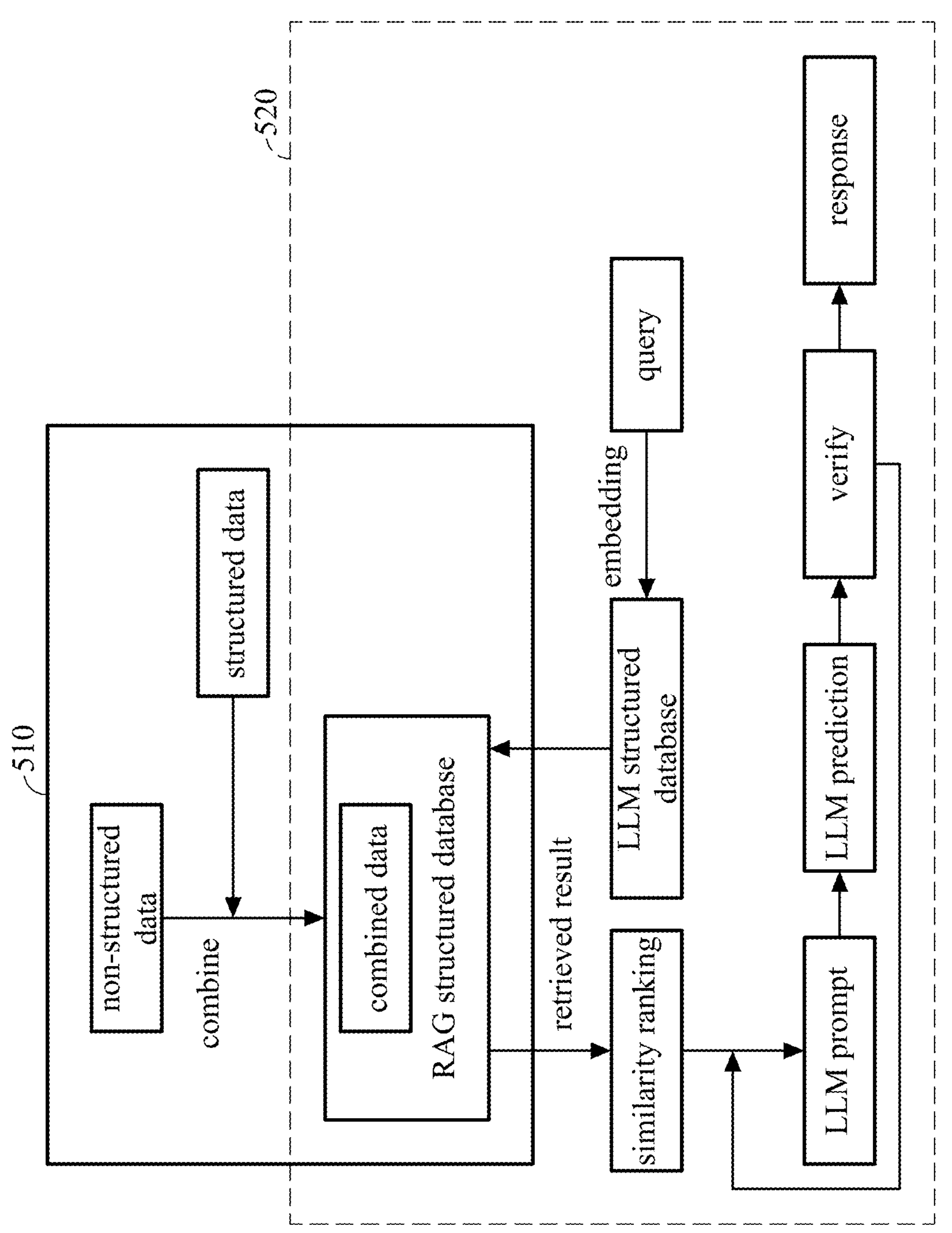
FIG. 5 is a schematic diagram of an LLM procedure according to an embodiment of the invention.

FIG. 5 is a schematic diagram of an LLM procedure according to an embodiment of the invention. The flow of the LLM procedure shown in FIG. 5 can be applied to the data processing device 100. As shown in FIG. 5, when the RAG procedure 510 is performed, the non-structured data and the structured data (or vector data) of the input data may be combined to a combined data (e.g., the image semantic data), and stored in the RAG structured database for the LLM procedure 520.

When the LLM procedure 520 is performed, the user may input a query (or a query and a prompt) to an LLM system. The LLM system may transform the query input by the user into a vector data through an embedding operation. Then, according to the vector data, the LLM system may obtain the related data matching with the query from an LLM structured database (e.g., a vector/vector/structured query language (SQL) database, or a vector relational database). The LLM structured database may comprise a relational database management system (RDBMS).

Then, according to the vector data, the LLM system may retrieve (or look up) the RAG structured database to find a combined data with a topic which matches the vector data. According to the data obtained from the LLM structured database and the combined data obtained from the RAG structured database, the LLM system may generate a retrieved result.

Then, the LLM system may perform a similarity ranking to the retrieved results, and generate a prompt (i.e., LLM prompt) according to the result of the similarity ranking. For example, the LLM system may use a top-K algorithm to sort the retrieved results and select the most similar retrieved results as a new prompt in the LLM system.

Then, according to the new prompt of the LLM system, the LLM system may perform a prediction to the query of the user to generate a prediction result. The LLM system may use an agent to verify the prediction result to determine whether the prediction result is right. The agent may be an AI system designed for a specific topic, or another LLM system, but the invention should not be limited thereto.

If the prediction result passes the verification, the LLM system may generate a response according to the prediction result. If the prediction result does not pass the verification, the LLM system may generate a new prompt again.

For the data processing device 100 provided in the invention, the data processing device 100 may combine the image and the text information (i.e., semantic data) to generate combined data (e.g., image semantic data). When the data processing device 100 performs the LLM operations, the LLM system may retrieve and classify the data with different models. That is, the LLM system may not need to process the data with different models respectively, and then combine the processed data with different models to obtain the comprehensive information. Therefore, according to the data processing device 100 provided in the invention, the LLM system may process the image and text information comprehensively to increase the processing performance for the multi-model data.

In addition, according to the data processing device 100 provided in the invention, the LLM system may reduce the number of retrieving the RAG structure database. For example, if there are 100 images and 200 image descriptions (i.e., semantic data), according to the method of generating the combined data provided in the invention, the 100 images and 200 image descriptions may form the combined data corresponding to 10 topics. Therefore, when the LLM system performs a retrieval operation on the RAG structure database, the LLM system may not retrieve all 100 images. The LLM may only need to retrieve the combined data whose topic matches the query. Therefore, the number of retrieving the RAG structure database can be reduced, and the performance of the LLM system may be increased accordingly. In addition, according to the data processing device 100 provided in the invention, the term frequency algorithm and clustering technology may be used to record (keep) the key descriptions and reduce (or exclude) the descriptions of region of no interest and irrelevant descriptions to make sure that the response of the LLM system is more accurate.

The data processing device 100 provided in the invention not only can be applied to the AOI for defect detection, but also can be applied to other applications. For example, the data processing device 100 may combine the X-ray image and the illustration about the X-ray image from a radiologist to generate combined data to increase the accuracy of the diagnosis. The data processing device 100 also can be applied to the autonomous vehicles technology. The data processing device 100 may combine the data from the image sensor (e.g., camera) and the light and radar sensor (e.g., light detection and ranging (LiDAR)) and related information to generate combined data to increase the accuracy of the autonomous vehicles.

Figure 6:
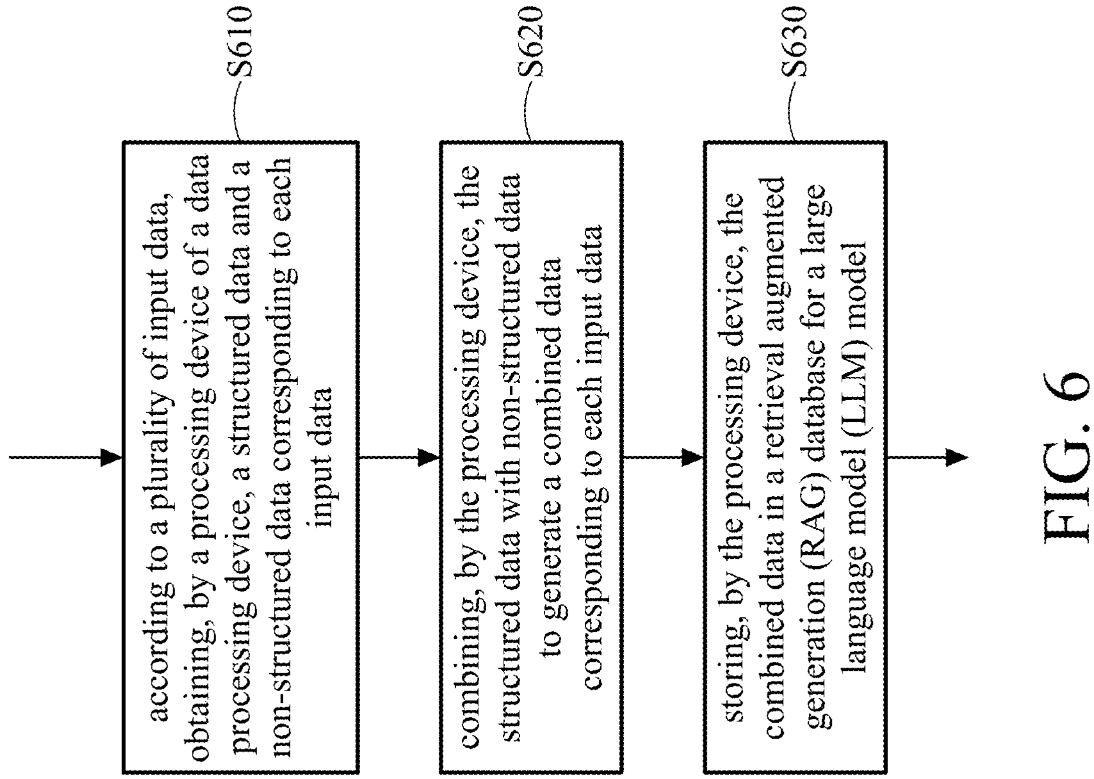
FIG. 6 is a flow chart 600 illustrating a data processing method according to an embodiment of the invention.

FIG. 6 is a flow chart 600 illustrating a data processing method according to an embodiment of the invention. The data processing method can be applied to the data processing device 100. As shown in FIG. 6, in step S610, according to a plurality of input data, the processing device 110 of the data processing device 100 may obtain the structured data and the non-structured data corresponding to each input data.

In step S620, the processing device 110 may combine the structured data with the non-structured data to generate combined data that corresponds to each input data.

In step S630, the processing device 110 may store the combined data to an RAG database for an LLM model.

According to an embodiment of the invention, in the data processing method, a plurality of input data may comprise a plurality of images, a plurality of videos, and a plurality of image tags.

According to an embodiment of the invention, in the data processing method, the structured data may comprise the semantic data corresponding to each input data, and the combined data may comprise the input data and semantic data.

According to an embodiment of the invention, in the data processing method, each combined data may correspond to a topic.

According to an embodiment of the invention, in the data processing method, the processing device 110 may cluster the combined data with different topics according to a clustering algorithm.

According to an embodiment of the invention, in the data processing method, the processing device 110 may obtain a query. In addition, the processing device 110 may transform the query into a vector data through an embedding operation. In addition, according to the vector data, the processing device 110 may obtain (or generate) a retrieved result from the data stored in the vector relational database and the combined data stored in the RAG database.

According to an embodiment of the invention, in the data processing method, the processing device 110 may retrieve (or look up) the RAG structured database to find a combined data with a topic which matches the vector data. In addition, according to the data obtained from the vector relational database and the combined data obtained from the RAG structured database, the processing device 110 may obtain (or generate) the retrieved result.

According to an embodiment of the invention, in the data processing method, the processing device 110 may perform a similarity ranking to the retrieved results. In addition, the processing device 110 may generate a prompt according to the result of the similarity ranking.

According to an embodiment of the invention, in the data processing method, the processing device 110 may input the query and the prompt to the LLM model to generate a prediction result.

According to an embodiment of the invention, in the data processing method, the processing device 110 may use an agent to verify the prediction result to determine whether the prediction result is right. If the prediction result passes the verification, the processing device 110 may output a response according to the prediction result.

According to the data processing method provided in the invention, the structured data and the non-structured data can be combined first to generate combined data (i.e., semantic data) that corresponds to different topics. When the LLM operations are performed, the LLM may only need to retrieve the combined data with the topic which matches the query of the user. Therefore, the number of performing the retrieve can be reduced, and the performance of the LLM system may also be increased accordingly Use of ordinal terms such as “first”, “second”, “third”, etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A data processing method, comprising:

in a retrieval augmented generation (RAG) procedure, according to a plurality of input data, obtaining, by a processing device of a data processing device, a structured data and a non-structured data corresponding to each input data;

in the RAG procedure, combining, by the processing device, the structured data with the non-structured data to generate a combined data corresponding to each input data, wherein the structured data comprises a semantic data corresponding to each input data, and the combined data comprises the input data and the semantic data, and wherein each combined data corresponds to a topic;

in the RAG procedure, storing, by the processing device, the combined data in an RAG database for a large language model (LLM) model; and performing, by the processing device, an LLM procedure based on the combined data and the topic corresponding to the combined data through the LLM model.

2. The data processing method of claim 1, wherein the plurality of input data comprises a plurality of images, a plurality of videos, and a plurality of image tags.

3. The data processing method of claim 1, further comprising:

clustering, by the processing device, the combined data with different topics according to a clustering algorithm.

4. The data processing method of claim 1, comprising:

obtaining, by the processing device, a query;

transforming, by the processing device, the query into a vector data through an embedding operation; and according to the vector data, obtaining, by the processing device, a retrieved result from data stored in a vector relational database and the combined data stored in the RAG database.

5. The data processing method of claim 4, further comprising:

retrieving, by the processing device, the RAG structured database to find a combined data with a topic which matches the vector data; and according to the data obtained from the vector relational database and the combined data obtained from the RAG structured database, obtaining, by the processing device, the retrieved result.

6. The data processing method of claim 4, further comprising:

performing, by the processing device, a similarity ranking to the retrieved results; and generating, by the processing device, a prompt according to a result of the similarity ranking.

7. The data processing method of claim 6, further comprising:

inputting, by the processing device, the query and the prompt to the LLM model to generate a prediction result.

8. The data processing method of claim 7, further comprising:

using, by the processing device, an agent to verify the prediction result; and if the prediction result passes the verification, outputting, by the processing device, a response according to the prediction result.

9. A data processing device, comprising:

a processing device, in a retrieval augmented generation (RAG) procedure, according to a plurality of input data, obtaining a structured data and a non-structured data corresponding to each input data, and combining the structured data with the non-structured data to generate a combined data corresponding to each input data, wherein the structured data comprises a semantic data corresponding to each input data, and the combined data comprises the input data and the semantic data, and wherein each combined data corresponds to a topic; and a retrieval augmented generation (RAG) database, storing the combined data for a large language model (LLM) model, wherein the processing device further performs an LLM procedure based on the combined data and the topic corresponding to the combined data through the LLM model.

10. The data processing device of claim 9, wherein the plurality of input data comprises a plurality of images, a plurality of videos, and a plurality of image tags.

11. The data processing device of claim 9, wherein the processing device clusters the combined data with different topics according to a clustering algorithm.

12. The data processing device of claim 9, wherein the processing device obtains a query, transforms the query into a vector data through an embedding operation, and according to the vector data, obtains a retrieved result from data stored in a vector relational database and the combined data stored in the RAG database.

13. The data processing device of claim 12, wherein the processing device retrieves the RAG structured database to find a combined data with a topic which matches the vector data, and according to the data obtained from the vector relational database and the combined data obtained from the RAG structured database, the processing device obtains the retrieved result.

14. The data processing device of claim 12, wherein the processing device performs a similarity ranking on the retrieved results, and generates a prompt according to a result of the similarity ranking.

15. The data processing device of claim 14, wherein the processing device inputs the query and the prompt to the LLM model to generate a prediction result.

16. The data processing device of claim 15, wherein the processing device uses an agent to verify the prediction result, and if the prediction result passes the verification, the processing device outputs a response according to the prediction result.

* * * * *